US012784046B2

(12) United States Patent
Graham

(10) Patent No.: US 12,784,046 B2
(45) Date of Patent: Nov. 3, 2026

(54) TRANSACTION AUTHORISATION

(71) Applicant: Visa Europe Limited, London (GB)

(72) Inventor: Lewis Graham, London (GB)

(73) Assignee: Visa Europe Limited, London (GB)

( * ) Notice: Subject to any disclaimer, the term of this patent is extended or adjusted under 35 U.S.C. 154(b) by 555 days.

(21) Appl. No.: 18/191,759

(22) Filed: Mar. 28, 2023

(65) Prior Publication Data

US 2023/0237485 A1 Jul. 27, 2023

Related U.S. Application Data

(62) Division of application No. 15/773,958, filed as application No. PCT/GB2016/053465 on Nov. 7, 2016, now Pat. No. 11,645,653.

(30) Foreign Application Priority Data

Nov. 6, 2015 (GB) ...................................... 1519676

(51) Int. Cl.

*G06Q 20/40* (2012.01)
*G06Q 20/32* (2012.01)
*G06Q 20/36* (2012.01)
*G06Q 20/38* (2012.01)
*H04L 9/08* (2006.01)

(52) U.S. Cl.

CPC ..... *G06Q 20/4014* (2013.01); *G06Q 20/3278* (2013.01); *G06Q 20/3672* (2013.01); *G06Q 20/3827* (2013.01); *G06Q 20/401* (2013.01); *H04L 9/0816* (2013.01)

(58) Field of Classification Search

CPC . G06Q 20/3827; G06Q 20/401; H04L 9/0816
See application file for complete search history.

(56) References Cited

U.S. PATENT DOCUMENTS 8,412,945 B2 4/2013 Sweet et al.
8,712,892 B2 4/2014 Dixon et al.
9,124,433 B2 9/2015 Marien et al.
(Continued)

FOREIGN PATENT DOCUMENTS

CN 1432180 A 7/2003
CN 1599921 A 3/2005
(Continued)

OTHER PUBLICATIONS

U.S. Appl. No. 15/773,958 , Final Office Action, Mailed On Sep. 28, 2022, 20 pages.
(Continued)

*Primary Examiner* — John W Hayes
*Assistant Examiner* — Taylor S Rak
(74) *Attorney, Agent, or Firm* — Kilpatrick Townsend & Stockton LLP

(57) ABSTRACT

There is discussed a method of authorising an electronic transaction in which a user device receives a shared secret and a shared secret identifier. Subsequently, on receipt of transaction data from a transaction terminal, the user device calculates a one-way hash of data comprising the shared secret to generate a hash value, generates authentication data comprising the hash value and the shared secret identifier, and transmits the authentication data to the transaction terminal.

16 Claims, 4 Drawing Sheets

(56) References Cited

U.S. PATENT DOCUMENTS

| | | | | |
|---|---|---|---|---|
| 9,344,427 | B1 | 5/2016 | Mehta et al. | |
| 9,911,121 | B2 * | 3/2018 | Wankmueller | G06Q 20/385 |
| 2004/0058952 | A1 | 3/2004 | Kajiwara | |
| 2006/0041757 | A1 | 2/2006 | Fang | |
| 2006/0122931 | A1 | 6/2006 | Walker et al. | |
| 2006/0236091 | A1 * | 10/2006 | Kaji | H04L 9/0838 713/150 |
| 2007/0244779 | A1 | 10/2007 | Wolff | |
| 2008/0104673 | A1 | 5/2008 | O'Connor et al. | |
| 2008/0208681 | A1 | 8/2008 | Hammad et al. | |
| 2009/0187757 | A1 | 7/2009 | Kerschbaum | |
| 2011/0216902 | A1 | 9/2011 | Kolesnikov | |
| 2012/0191615 | A1 * | 7/2012 | Schibuk | G06Q 20/401 705/76 |
| 2012/0323717 | A1 | 12/2012 | Kirsch | |
| 2012/0324242 | A1 | 12/2012 | Kirsch | |
| 2013/0042115 | A1 | 2/2013 | Sweet et al. | |
| 2013/0173474 | A1 | 7/2013 | Ranganathan et al. | |
| 2013/0275307 | A1 * | 10/2013 | Khan | H04W 12/068 705/64 |
| 2014/0058952 | A1 * | 2/2014 | Pinkas | G06Q 20/401 705/71 |
| 2014/0074637 | A1 | 3/2014 | Hammad | |
| 2014/0108260 | A1 | 4/2014 | Poole et al. | |
| 2014/0189359 | A1 | 7/2014 | Marien et al. | |
| 2014/0279309 | A1 | 9/2014 | Cowen et al. | |
| 2015/0161587 | A1 | 6/2015 | Khan et al. | |
| 2015/0170145 | A1 | 6/2015 | Patel et al. | |
| 2016/0065370 | A1 * | 3/2016 | Le Saint | H04L 9/321 713/155 |
| 2016/0092872 | A1 * | 3/2016 | Prakash | G06Q 20/322 705/65 |
| 2016/0140545 | A1 * | 5/2016 | Flurscheim | H04L 9/3234 705/76 |
| 2016/0285628 | A1 | 9/2016 | Carrer et al. | |
| 2017/0286955 | A1 | 10/2017 | Moskowitz | |
| 2019/0097794 | A1 * | 3/2019 | Nix | G06F 21/33 |

FOREIGN PATENT DOCUMENTS

| | | | |
|---|---|---|---|
| CN | 1849632 | A | 10/2006 |
| CN | 101872399 | A | 10/2010 |
| CN | 102231776 | A | 11/2011 |
| CN | 103514536 | A | 1/2014 |
| CN | 104169954 | A | 11/2014 |
| CN | 104603810 | A | 5/2015 |
| CN | 104850984 | A | 8/2015 |
| GB | 201407846 | | 6/2014 |
| GB | 2519826 | A | 5/2015 |
| WO | 2006079145 | A1 | 8/2006 |
| WO | 2007036763 | A1 | 4/2007 |
| WO | 2008068675 | A2 | 6/2008 |
| WO | 2012078964 | A1 | 6/2012 |
| WO | 2013151797 | A1 | 10/2013 |
| WO | 2014029620 | A1 | 2/2014 |

OTHER PUBLICATIONS

U.S. Appl. No. 15/773,958 , Final Office Action, Mailed On Dec. 11, 2020, 22 pages.

U.S. Appl. No. 15/773,958 , Final Office Action, Mailed On Dec. 6, 2021, 25 pages.

U.S. Appl. No. 15/773,958 , Non-Final Office Action, Mailed On Apr. 28, 2022, 20 pages.

U.S. Appl. No. 15/773,958 , Non-Final Office Action, Mailed On Jul. 9, 2020, 21 pages.

U.S. Appl. No. 15/773,958 , Non-Final Office Action, Mailed On Jun. 25, 2021, 22 pages.

U.S. Appl. No. 15/773,958 , Notice of Allowance, Mailed On Feb. 1, 2023, 9 pages.

Application No. CN201680075235.4 , Office Action, Mailed On Aug. 11, 2021, 19 pages.

Forrest et al., "Building Diverse Computer Systems", Proceedings. The Sixth Workshop on Hot Topics in Operating Systems, Jun. 1997, pp. 1-6.

Hassinen et al., "Utilizing National Public-Key Infrastructure in Mobile Payment Systems", Electronic Commerce Research and Applications, vol. 7, No. 2, Mar. 28, 2007, 2 pages.

"Cloud Based Payments Platform", Available online at: http://www.rigaitdemocentre.com/en/it-portfolio/84-cloud-based-payments-platform., 2023, 2 pages.

"EMV-TT A Vinualised Payment System", Proxama, Available online at: Available from: http://www.proxama.com/wp-contenUuploads/2015/09/EMV-TTA_VIRTUALISED-PAYMENT-SYSTEM.pdf., 2015, 10 pages Application No. PCT/GB2016/053465 , International Search Report and Written Opinion, Mailed On Jan. 24, 2017, 10 pages.

GB1407846.3 , "Search Report", Mar. 18, 2015, 2 pages.

GB1407846.3 , "Search Report", Nov. 12, 2014, 2 pages.

* cited by examiner

TRANSACTION AUTHORISATION

This application is a Divisional of U.S. patent application Ser. No. 15/773,958 filed May 4, 2018, which is a National Stage of International Application No. PCT/GB2016/053465 filed Nov. 7, 2016, and which claims the benefit of Great Britain Patent Application No. GB 1519676.9 filed Nov. 7, 2015, of which are all herein incorporated by reference.

FIELD OF THE INVENTION

The present invention relates to systems and methods for authorising electronic transactions, and in particular, but not exclusively to authorising contactless payment transactions made at a point of sales using a payment device.

BACKGROUND

A variety of methods for effecting payment transactions without the use of cash exist. For example, payment may be effected using a financial instrument such as a payment card by interacting with an electronic payment terminal, which may be located at a Point of Sales (PoS) within an establishment such as a retail establishment or restaurant. The payment card may include a magnetic stripe containing information such as data relating to the account holder and an account from where the funds for the transaction may be drawn. Such a magnetic stripe payment card is typically swiped through a magnetic card reader which reads data necessary for enacting the transaction. In another example, some payment cards are embedded with a semiconductor device (a "chip") storing the above information and an interface is provided on the card for interacting with a card reader. This interface typically takes the form of physical conductive pads.

Transactions using financial instruments may involve verification (authentication) of the user. For example, the user may be required to provide a signature. Alternatively, the user may be required to input a Personal Identification Number (PIN) on the terminal when prompted. The PIN may be sent to a server, in encrypted form, for verification in a technique referred to as online PIN verification. Alternatively, in the case of a financial instrument including a chip as described above, the chip may include a secure memory storing the PIN data. In this case, the user enters a PIN on the terminal when prompted, which is compared with the PIN stored in the card in a technique that is often referred to as offline PIN verification. Each of the above verification methods can be time consuming and inconvenient for the user. Payment transaction methods which do not involve verification of the user have also been developed.

A so-called contactless payment transaction method has been developed. A contactless payment device is provided with an antenna which enables it to interact with a contactless payment terminal when held in close proximity to same, to provide the information necessary to enact a payment transaction as described above. Such payment transactions often do not require the user to perform a verification process, such as the provision of a signature or a PIN as described above. This enables the payment transactions to be performed quickly and easily, but also involves a lower level of security of the transactions. One countermeasure against fraud that has been implemented is to impose a limit on the value of transactions that may be enacted using contactless payment methods without user verification in all countries which operate such methods. For transactions above this limit, it may be necessary for the user to provide a PIN, for example where the infrastructure for online PIN verification exists, or the user may be required to use a different payment method, such as 'Chip & PIN'. This means that the convenience of contactless payment transactions is reduced.

For contactless payment transactions, it is difficult to secure the communication between the contactless payment device and the contactless payment terminal. However, the protocols for communicating between the contactless payment device and the contactless payment terminal have limited flexibility for implementing new data security techniques. If the contactless payment device includes functionality for accessing the Internet, as is present for example in many mobile phones, then various online data security techniques have been proposed. However, a disadvantage of data security techniques that require an Internet connection at the time of a transaction is that an Internet connection is not always available when a transaction takes place.

SUMMARY OF THE INVENTION

In accordance with at least one embodiment, methods, devices, systems and software are provided for supporting or implementing functionality to authorise a payment transaction.

This is achieved by a combination of features recited in each independent claim. Dependent claims prescribe further detailed implementations of various embodiments.

In accordance with a first aspect, there is provided a method of authorising a transaction, the method comprising a user device receiving a shared secret and a shared secret identifier, receiving transaction data from a transaction terminal, calculating a one-way hash of data comprising the shared secret to generate a hash value, generating authentication data comprising the hash value and the shared secret identifier, and transmitting the authentication data to the transaction terminal. The receiving of the shared secret and the shared secret identifier need not occur during the transaction process. Accordingly, the shared secret can be supplied to the user device in advance of a transaction, and therefore a transaction can be performed offline, i.e. without an Internet connection, without needing to transmit the shared secret from the transaction terminal to the user device. The transmission of the authentication data can be achieved using the data formats available in existing contactless transaction protocols.

The method may comprise the user device receiving a plurality of shared secrets and a plurality of shared secret identifiers, each shared secret identifier corresponding to a respective shared secret, wherein the authentication data comprises the shared secret identifier corresponding to the shared secret used in the calculation of the hash value. In this way, a plurality of transactions may be performed without requiring an Internet connection.

The user device may receive the shared secret and the shared secret identifier via a first communication link, and transmit the authentication data via a second communication link different from the first communication link. The first communication link may communicate data using the Internet Protocol, and the second communication link may communicate data using a Near Field Communication protocol.

The method may further comprise verifying the identity of the user of the user device, with the data used to calculate the hash value further comprising information relating to the identity verification. The verifying of the identity of the user may comprise using a Fast Identity Online technique.

The transaction may comprises a contactless payment transaction, in which case the payment terminal comprises a contactless payment terminal and the user device comprises a contactless payment device.

In accordance with a second aspect, there is provided a method of validating a transaction, the method comprising a validation platform provisioning a user device with a shared secret and a shared secret identifier, receiving authentication data for a transaction, the authentication data identifying the user and comprising a transaction hash value and a transaction shared secret identifier, verifying that the transaction shared secret identifier corresponds to a valid shared secret; calculating a verification hash value by calculating a one-way hash of data comprising the shared secret corresponding to the transaction shared secret identifier; and comparing the transaction hash value and the verification hash value to determine if the transaction is valid. By provisioning a shared secret identifier in conjunction with a corresponding shared secret, the validation platform in is able to identify the shared secret used to calculate the transaction hash value without the provision of the shared secret forming part of the transaction process at the time of the transaction. Accordingly, the shared secret can be provided to the user device in advance of a transaction, and therefore a transaction can be performed offline, i.e. without an Internet connection, without needing to transmit the shared secret from the transaction terminal to the user device.

The validation platform may provide the user device with a plurality of shared secrets and a plurality of shared secret identifiers, each shared secret identifier corresponding to a respective shared secret. In this way, a plurality of transactions may be performed without requiring an Internet connection.

Following receipt of authentication data including a shared secret identifier, the validation platform may invalidate the shared secret corresponding to the shared secret identifier for future transactions. In this way, protection against replay attacks is provided.

The data used to calculate the verification hash value may further comprise information relating to the identification of the user.

According to a third aspect of the invention, there is provided an apparatus comprising a first interface for receiving a shared secret and a shared secret identifier from a remote device via a first communication system and a second interface for receiving transaction data from a transaction terminal via a second communication system, the apparatus being arranged to calculate a one-way hash of data comprising the shared secret to generate a hash value, generate authentication data comprising the hash value and the shared secret identifier, and transmit the authentication data to the transaction terminal.

According to a fourth aspect of the present invention, there is provided an apparatus arranged to provision a remote user device with a shared secret and a shared secret identifier, the apparatus being further arranged to receive authentication data for a transaction, the authentication data identifying the user and comprising a transaction hash value and a transaction shared secret identifier, verify that the transaction shared secret identifier corresponds to a valid shared secret, calculate a verification hash value by calculating a one-way hash of data comprising the shared secret corresponding to the transaction shared secret identifier; and compare the transaction hash value and the verification hash value to determine if the transaction is valid.

Further features and advantages will become apparent from the following description of preferred embodiments, given by way of example only, which is made with reference to the accompanying drawings.

DETAILED DESCRIPTION OF ILLUSTRATIVE EMBODIMENTS

Figure 1:
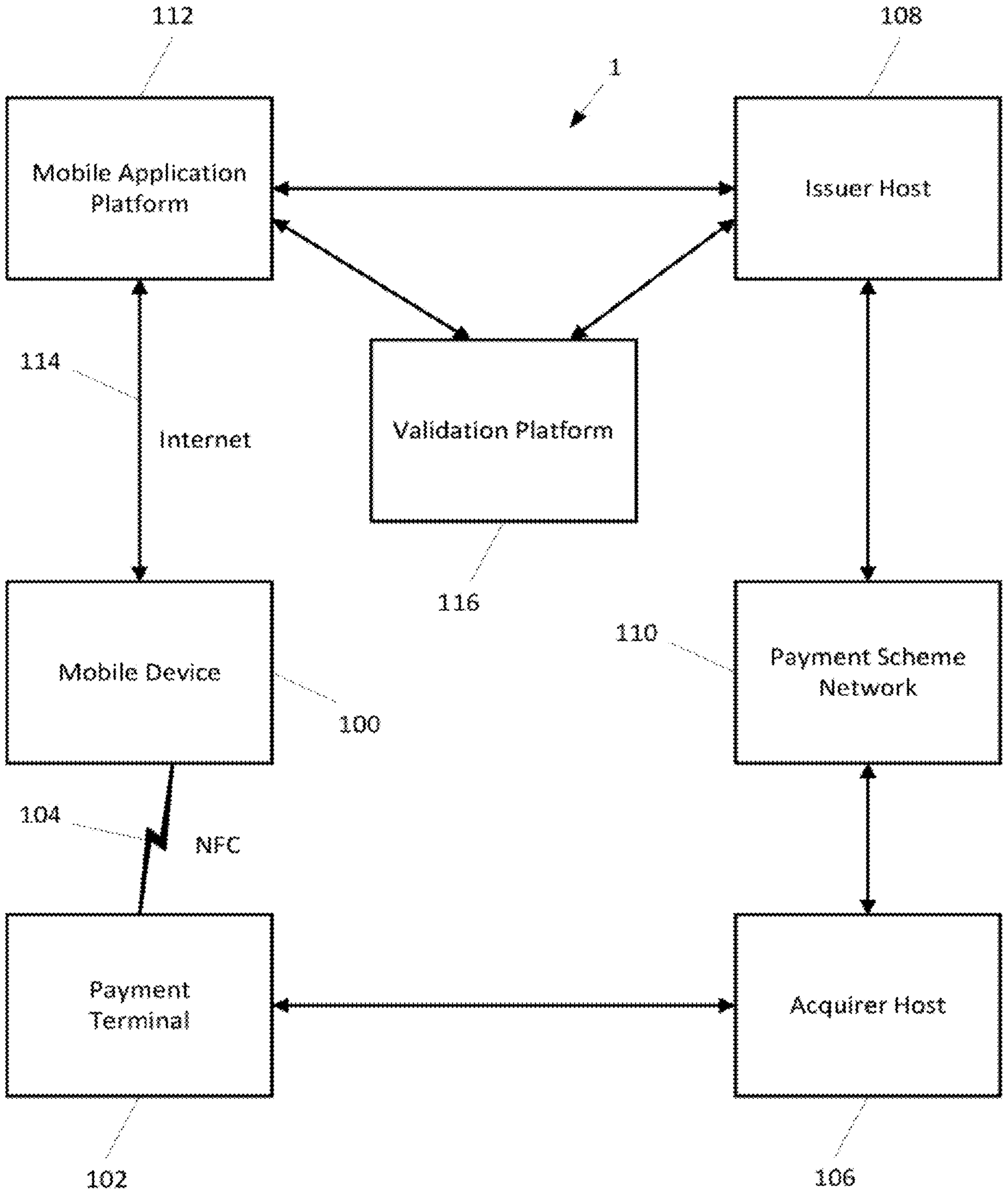
FIG. 1 shows a schematic diagram of a payment transaction system in which embodiments of the invention may be practised.

FIG. 1 illustrates a transaction system 1 in which embodiments may be implemented. In particular, the transaction system of FIG. 1 is a payment transaction system in which a mobile device 100 can perform a contactless payment transaction with a contactless payment terminal 102 over a first communication link 104 using Near Field Communication (NFC). The NFC communication protocol is standardised in ISO/IEC 18092.

In the transaction system 1, the contactless payment terminal 102 is a Point of Sales (PoS) terminal located in a business premises, for example a shop, restaurant, cinema, station or other location, and is arranged to process payment transactions on behalf of the business or other entity associated with the PoS terminal.

The contactless payment terminal 102 is able to maintain or establish a data connection with an acquirer host 106 which typically takes the form of a server system of one or more computing devices for processing transactions associated with a financial institution, such as a bank, which manages one or more financial accounts of the entity associated with the POS. The communication between the contactless payment terminal 102 and the acquirer host is typically via a leased line.

An issuer host 108 is a server system of one or more computing devices arranged to process transactions associated with a financial institution, such as a bank, which manages one or more financial accounts of a user of the mobile device 100.

Each of the acquirer host 106 and the issuer host 108 is capable of communicating with a payment scheme network 110. The payment scheme network 110 is a server system of computing devices which may be associated with a financial services organisation, for example.

In the transaction system 1, the operating system of the mobile device 100 supports Host Card Emulation or the like that permits cloud-based payment transactions using a mobile application (not shown in FIG. 1) stored by the mobile device 100. The mobile application in the transaction system 1 is not stored in a secure element within the mobile device (such as an ISIM) card, and therefore sensitive account information such as the Primary Account Number (PAN) is stored in servers linked to the mobile application to provide security for the sensitive account information. The mobile application is able to communicate with a mobile application platform 112 using a second communication link 114 using the Internet Protocol when the mobile device 100 is online (i.e. when an Internet connection exists). The mobile application platform 112 is able to communicate with the issuer host 108.

As shown in FIG. 1, the mobile application platform 112 is also able to communicate with a validation platform 116. A communication link also exists between the validation platform 116 and the issuer host 108.

Although the mobile application platform 112 and the issuer host 108 are shown separately in FIG. 1, the mobile application platform 112 could be hosted by one or more servers of the issuer host 108. Similarly, although the validation platform 116 is shown separately from the issuer host 108, the validation platform 116 could be hosted by one or more servers of the issuer host 108.

As will be described in detail hereafter, the validation platform 116 provisions, via the mobile application platform 112, the mobile application within the mobile device 100 with an indexed list of shared secrets (which will hereinafter be referred to as a Relying Party Provisioned Challenges or RPPCs) in which each shared secret is associated with a corresponding shared secret identifier. An RPPC is known only within the validation platform 116 and within the mobile application of the mobile device 100. An RPPC is used when forming an application cryptogram for a transaction. After the transaction has been completed, the validation platform 116 marks the RPPC used for that transaction as no longer being valid.

Figure 2:
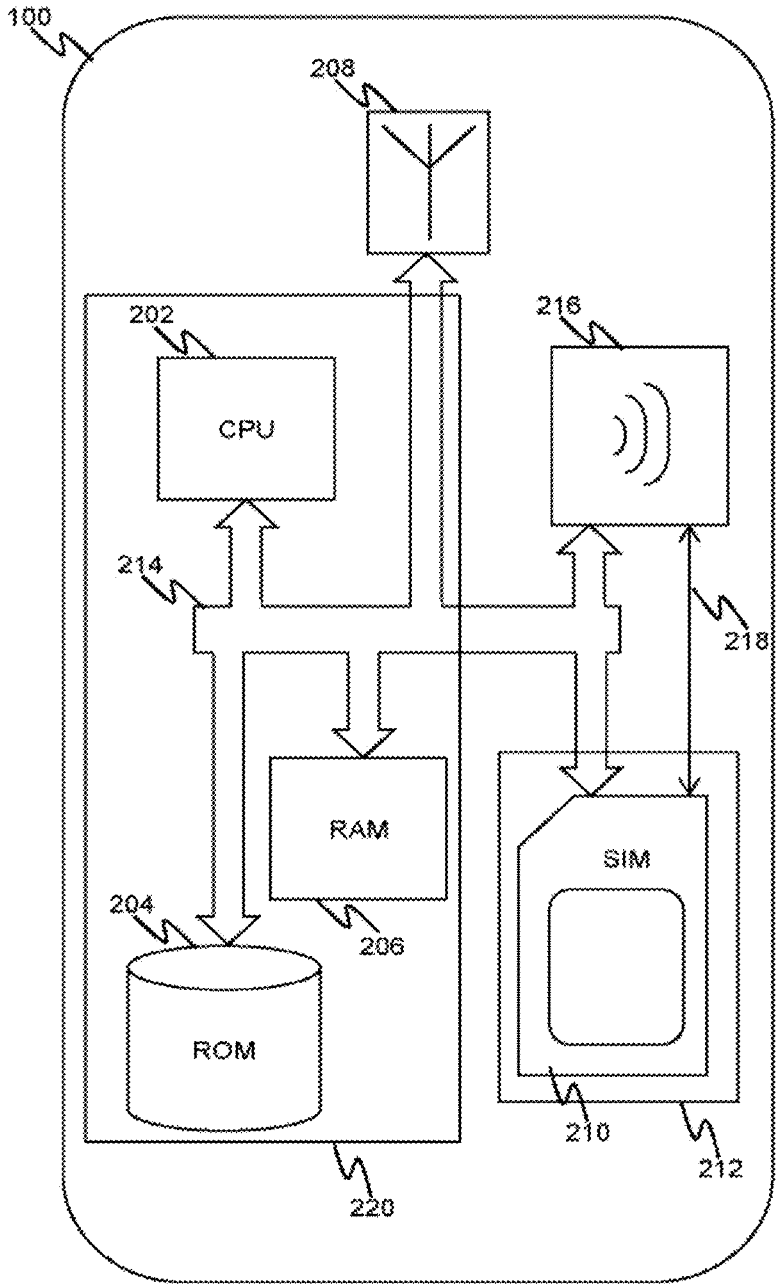
FIG. 2 schematically illustrates a payment device for use in an embodiment.

FIG. 2 illustrates exemplary components of a user device according to embodiments of the present invention wherein the user device comprises a mobile telephony device.

User device 100 comprises conventional computational hardware including a processing portion 202, read only memory 204, random access memory 206, and other standard hardware such as an input/output controller, display controller etc. (not shown). User device 200 also comprises specific mobile telephony hardware including telephony antenna 208, and SIM card 210. The SIM card 210 constitutes a secure processing environment on the user device, also known as secure element 212, and incorporates additional security measures such as tamper resistance. The components described above are accessible to processing portion 202 via an internal communication structure, such as system bus 214. The operation and interaction of these components is well known in the art and therefore will not be covered in further detail here.

User device 100 also includes short range wireless communications hardware, including short range wireless antenna 216, which can be used to make contactless communication with the PoS terminal 102, and may be an NFC antenna.

Typically, where short range wireless antennas have hitherto been provided in known mobile telephony devices, they have been controlled by the SIM 210, via a dedicated communication channel 218, separate to system bus 214. The dedicated communication channel 218 may, for example, use the Single Wire Protocol for communication. According to embodiments of the present invention, the short range wireless antenna is accessible from an area outside of secure element 212, hereafter known as the standard application environment 220, for example via the system bus 214. This feature is presently available, for example, in the host card emulation functionality of the Android operating system.

Standard application environment 220 also comprises the payment application deployed on device 100. The payment application may be installed on the standard application environment at the time of manufacture of the device, or under the supervision of the issuing bank. Alternatively the payment application may be installed by the end user of the device. An end user may install the application by downloading the installation files to the user device, for example via the internet. Alternatively a user may install the application by downloading the installation files first to another device, such as a personal computer, and then sideloading the files onto to the user device, for example via a USB connection. Alternatively still, a user may obtain the installation files by accessing an application portal on the user device, such as the Apple® AppStore™, or the Android Market™, which facilitate an integrated download and installation of application files. The download of installation files facilitated by an application portal may be provided via an available internet connection, or over-the-air provisioning (OTAP).

Figure 3:
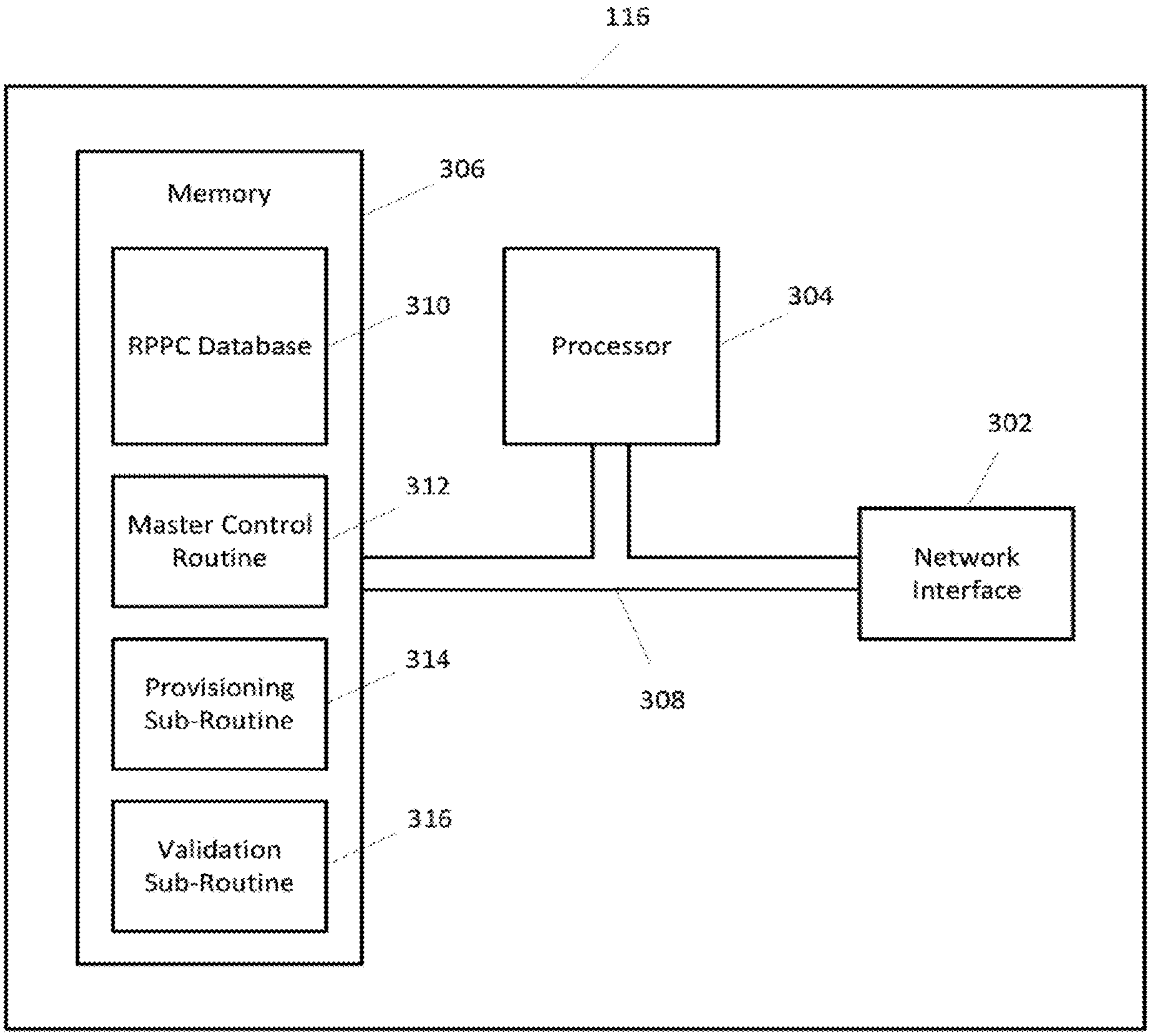
FIG. 3 schematically illustrates a validation platform for use in an embodiment.

FIG. 3 shows exemplary components of the validation platform 116. As shown, the validation platform 116 includes a network interface 302, a processor 304 and memory 306 interconnected by bus system 308. The memory 306 stores data including an RPPC database 310, and program code including a Master Control routine 312, a Provisioning sub-routine 314 and a Validation sub-routine 316.

The RPPC database 310 stores for each user device 100 a table of RPPC codes. Each RPPC code is associated with an index number, an expiry date and a status, which may be valid or invalid.

The Provisioning sub-routine 314 is initiated by the Master Control routine 312 to provide new RPPC codes to a user device 100. The execution of the Provisioning sub-routine 314 may be initiated in response to receipt of a request by the user device 100. The Provisioning sub-routine 314 forwards at least one new RPPC code to the user device 100, together with an index number for each RPPC code forwarded and the expiry date. The Provisioning sub-routine also stores each forwarded RPPC code and corresponding index number and expiry date in the table in the RPPC database 310 for that user device 100, and sets the status of each forwarded RPPC code to valid.

As will be discussed in more detail hereafter, the Validation sub-routine 316 is initiated by the Master Control routine 312 to validate an application cryptogram received from the issuer host 108. After the use of a valid RPPC in a transaction, the status of the RPPC in the table for the user device 100 is set to invalid in order to prevent reuse of the RPPC. In this way, possible "replay" attacks, in which bogus transaction data is prepared using an RPPC that has been already used for a previous transaction are prevented.

Before the transaction is completed, the payment terminal 102 must ensure that the presented user device 100 is both genuine, and authorised to complete the transaction. Authentication of payment devices and authorisation of transactions are handled according to transaction protocols, which ensure the interoperability of a range of payment devices and payment terminals.

The transaction system 1 of FIG. 1 uses the EMV (Europay®, Mastercard®, Visa®) transaction protocols, as defined for example in the EMV Contactless Specifications for Payment Systems, which are publicly available and published by EMVCo LLC. These protocols are referred to herein as simply "EMV".

EMV provides methods that support dynamic signature generation, of which Dynamic Data Authentication (DDA) is the simplest. Additionally, EMV provides a method called Fast DDA (fDDA) which is optimised for contactless transactions, and a method called Combined Data Authentication (CDA), which combines DDA with the subsequent step of Application Cryptogram Generation (described below), in order to allow both operations to be completed in parallel.

EMV provides for transaction authorisation through the generation of application cryptograms. Depending on which options are used from the various EMV specifications, there are several mechanisms available for application cryptogram generation. Throughout the transaction processing, the success or failure of certain checks and actions, such as those described above in relation to offline data authentication, can be recorded in a Terminal Verification Results (TVR) data.

The TVR data is reviewed during Terminal Action Analysis, and on the basis of its contents, the terminal makes a preliminary decision about whether the transaction should be approved offline, authorised online, or declined. Approval offline comprises the terminal deciding that the transaction can take place without seeking express permission from the Issuing Bank. Online authorisation comprises sending details of the transaction to the Issuing Bank for authorisation before approving the transaction. In some circumstances, the terminal will decline the transaction offline, before seeking authorisation from the Issuing Bank.

The decision of the appropriate course of action for the terminal to take is made on the basis of Terminal Action Codes (TAC) and Issuer Action Codes (IAC). TACs are programmed into the terminal by the acquiring bank, and define the circumstances under which a transaction should be approved offline, authorised online, or declined. IACs are deployed into the payment application by the issuing bank, and also define a set of circumstances under which a transaction should be approved offline, authorised online, or declined. The terminal uses both the TACs and the IACs in order to make a preliminary decision on how to process the transaction.

Figure 4:
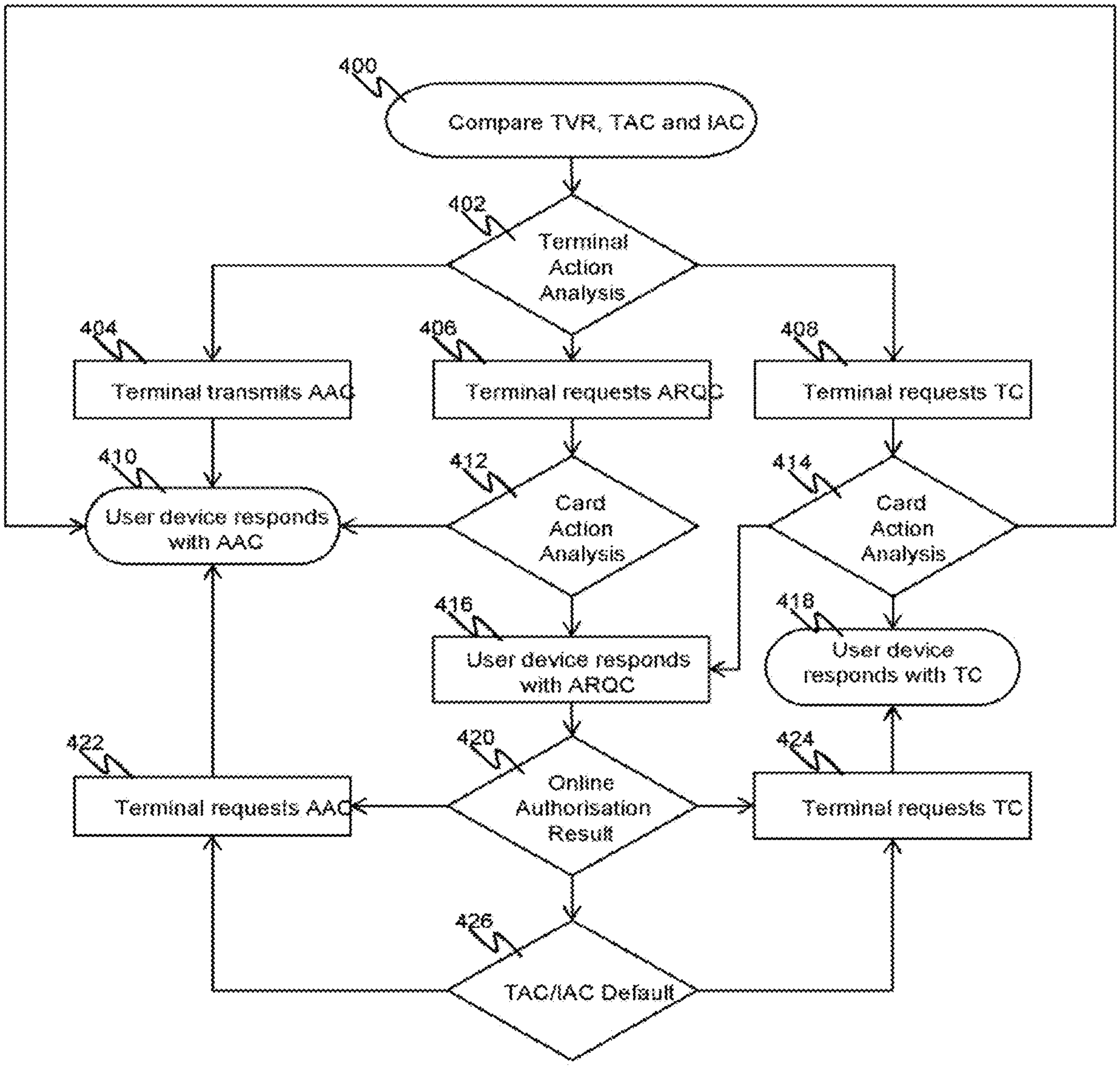
FIG. 4 shows a process flow of an authentication process performed by a user device and a payment terminal according to an embodiment.

FIG. 4 illustrates an exemplary Application Cryptogram Generation command flow diagram according to the EMV transaction protocols.

The flow begins at step 400 by comparing the contents of the TVR to the TACs stored at the payment terminal 102 and the IACs retrieved from the payment application on the user device 100. On the basis of the comparison, the payment terminal 100 makes a preliminary decision about whether the transaction should be approved offline, authorised online, or declined in step 402.

Depending on the result of the decision made at step 402, the terminal requests a specific type of Application Cryptogram to be generated by sending a GENERATE AC command to the user device 100. If the payment terminal 102 decides to decline the transaction offline, the GENERATE AC command requests Application Authentication Cryptogram (AAC) in step 404. If the payment terminal 102 decides to attempt to authorise the transaction online, the GENERATE AC command requests an Authorisation Request Cryptogram (ARQC) in step 406. If the payment terminal 102 decides to approve the transaction offline, the GENERATE AC command requests a Transaction Certificate (TC) in step 408.

In response to the GENERATE AC command issued by the payment terminal 102, the user device 100 may perform its own risk management in the form of "Card Action Analysis". Card action analysis is performed on the basis of parameters determined by the issuer and stored on the user device 100. The result of the Card Action Analysis can only elect an authorisation method the same as determined by the payment terminal 102 or stricter.

If the payment terminal 102 decides to reject the transaction offline by requesting an AAC as per step 404, the user device 100 must respond with an AAC in step 410. Any other response from the user device 100 will cause the transaction processing to fail.

If the payment terminal 102 decides to attempt to send the transaction online for authorisation by the issuing bank by requesting an ARQC as per step 406, as a result of the Card Action Analysis in step 412 the user device 100 may decide to respond with an ARQC in step 414 as requested, or elect to decline the transaction offline by responding with an AAC in step 410. A response from the user device 100 comprising a TC will cause the transaction processing to fail.

If the payment terminal 102 decides to allow the transaction offline by requesting a TC as per step 408, as a result of the Card Action Analysis in step 414 the user device may decide to respond with a TC in step 418 as requested, elect to send the transaction online for authorisation by the issuing bank by responding with an ARQC in step 416, or elect to decline the transaction by responding with an AAC in step 410.

If the user device 100 responds with an ARQC, the payment terminal 102 attempts to send this to the issuing bank for authorisation in step 420. If the result of the online authorisation procedure is to reject the transaction, the payment terminal 102 requests an AAC in step 422 by sending a second GENERATE AC command, and the AAC is returned by the user device in step 410. If the result of the online authorisation procedure is to authorise the transaction, the payment terminal 102 requests a TC in step 424 by sending a second GENERATE AC command, and the AAC is returned by the user device 100 in step 416.

Alternatively, if the online authorisation procedure cannot be completed, the terminal reverts to a default method as defined in the TAC/IAC, by sending a second GENERATE AC command which either requests an AAC as per step 422, which is returned by the user device 100 in step 410, or a TC in step 424, which is returned by the user device 100 in step 418.

Once the user device 100 has responded with either an AAC or a TC as per steps 410 or 418 respectively, the Application Cryptogram Generation command flow is completed.

In order to respond to a GENERATE AC command issued by the terminal, the user device 100 must produce an Application Cryptogram. An Application Cryptogram is produced on the basis of data sent to the user device 100 in the data field of the GENERATE AC command. The data to be used is specified in a Card Risk Management Data Object List (CDOL), which is stored in the user device 100. The user device 100 stores two CDOLs, one for use with the first GENERATE AC command issued in a given transaction, and the other to be used if a second GENERATE AC command is issued.

The Application Cryptogram is generated by applying a hash algorithm to a data set specified by a CDOL to generate a hash value. A hash algorithm is a one-way mathematical operation that is used to generate a fixed size result on the basis of a large or variably sized data input. The result depends on the entire data input, and it is computationally difficult to determine input data that would produce a given result. EMV recommends the use of the Secure Hash Algorithm (SHA-1) as standardised in ISO/IEC 10118-3.

In addition to the Application Cryptogram, in this embodiment the user device 100 also generates a supplementary hash value by applying a hash algorithm to a further data set including an RPPC, and optionally also the result of a user verification process (such as password or PIN entry, a biometric test or a technique such as FIDO) and possibly also verification data associated with the user verification process. The supplementary hash value is included together with the RPPC index corresponding to the RPPC used to generate the supplementary hash value in the ARQC data. The supplementary hash value is sufficiently small that the supplementary hash value and the RPPC index can be included in available space within the EIV message conveying the ARQC data.

When the issuer host 108 receives the ARQC data, the supplementary hash value and the RPPC index are forwarded to the validation platform 116, which determines from the RPPC index the corresponding RPPC, checks that the corresponding RPPC is valid for that user device 100, and then calculates a validation hash value using the set of data used to generate the supplementary hash value in the ARQC data, and then compares the validation hash value with the supplementary hash value in the ARQC data. If the validation hash value matches the supplementary hash value, then the validation platform 116 sends a message to the issuer host 108 indicating that the user device 100 is authenticated. If the validation hash value does not match the supplementary hash value, then the validation platform 116 sends a message to the issuer host 108 indicating that the user device 116 is not authenticated. Whether or not the validation hash value matches the supplementary hash value in the ARQC data, the validation platform 116 then marks the RPPC value invalid for future transactions.

In use, typically, the contactless payment terminal 102 is configured to initiate a payment by a vendor. For example, the vendor may manually enter a transaction amount into the contactless payment terminal 102, or the value of goods and/or services due for payment may be determined by some other means, such as by a barcode reader reading barcodes provided on products for purchase, for example. In order to initiate a contactless payment transaction, it may be necessary to select a particular option on the contactless payment terminal 102, the contactless payment terminal 102 may be configured only to accept contactless payments or it may be configured to automatically enact a contactless payment transaction on detection of an appropriate contactless user device 100.

Once the contactless payment terminal 102 has been appropriately configured, the user (e.g. customer at a retail establishment) performs a user verification process on the user device 100 and then brings the contactless user device 100 into proximity with the contactless payment terminal 102. This results, for example, in the contactless payment terminal 102 sending a request to the contactless user device 100 to provide data for enacting the payment transaction. In response, the user device 100 retrieves sends the requested data to the contactless payment terminal 102. The provided data may include data identifying a payment account from which funds are to be drawn in the payment transaction, such as a PAN and an identifier of the issuer associated with the contactless payment device 100. Messages sent by the user device 100 may be in protected form. For example, it may comprise a cryptogram, for example an EMV compliant Authorisation ReQuest Cryptogram (ARQC).

On receipt of a message, the contactless payment terminal 102 determines, based on, for example, the presence of an ARQC that it is to obtain authorisation information from the issuer host 108. The contactless payment terminal 102 then sends an authorisation request message to acquirer host 106, the message including the information received from the contactless payment device 100. The message may also include a transaction identifier to identify the transaction, the identifier being included in the message by the contactless payment terminal 102. The message may also include other data added by the contactless payment terminal 102, such as a value of the transaction.

On receipt of the message, the acquirer host 106 forwards same to the payment scheme network 110. In the present embodiment, the payment scheme network 110 routes the message to the issuer host 108 (for example, based on an indicator of the issuer included in the message). The issuer host 108 receives the authorisation request message, cryptographically verifying same using the validation platform 116 where appropriate, and performs a determination process to determine whether to authorise the contactless payment transaction. The issuer host 108 then returns a result of the determination to the acquirer host 106, via the payment scheme network 110, in a message including an indicator as to whether or not the transaction is authorised. It may also include a transaction identifier the same as or corresponding to the transaction identifier provided by the contactless payment terminal 102 as described above.

The message sent by the issuer host 108 is routed to the contactless payment terminal 102 via the payment scheme network 110 and acquirer host 106. On receipt of the message, the payment terminal 102 identifies the result of the verification based on the content of the message, and may indicate same, for example on a display screen of the contactless payment terminal 102. If the contactless payment transaction is not authorised, the user may be presented with further options for completing the transaction.

Although the above systems and methods have been described in the context of contactless payment transactions, other types of payment transactions may be used. For example, the above payment authorisation methods may be used for payments in which a financial instrument such as a debit or credit card is brought into contact with a payment terminal, for example by swiping a magnetic strip on the card on a reader of the payment terminal or inserting a card including a chip into a reader on the payment terminal. Further, the systems and methods applied above can be used in transactions other than payment transactions. For example, the systems and methods described above can be used in an electronic access system in which a terminal device (analogous to a lock) authenticates a user device (analogous to a key) before providing access. Such an electronic access system may provide access to data. Alternatively, such an electronic access system may be used to open a door to a safe, or a room or the like.

As discussed previously, using a shared secret in the form of an RPPC as discussed above can prevent replay attacks. In addition, relay attacks can be largely defeated if the data set used to calculate the hash value in the ARQC included some transaction specific data.

The various memories described above may take the form of any suitable date store, including Random Access Memory (RAM) and/or Read Only Memory (ROM) data stores. The various processors may take the form of a semiconductor chip, such as a Central Processing Unit (CPU) for example.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

The invention claimed is:

1. A method of validating an electronic transaction by a validation platform, the method comprising:

setting a status associated with a shared secret as being valid, the status limiting usage of the shared secret to at most one electronic transaction;

provisioning a user device with the shared secret and a shared secret identifier associated with the shared secret;

receiving authentication data for a transaction, the authentication data identifying a user of the user device and comprising a transaction hash value and a transaction shared secret identifier;

verifying that the transaction shared secret identifier corresponds to a valid shared secret based on the status associated with the shared secret corresponding to the transaction shared secret identifier;

calculating a verification hash value by calculating a one-way hash of data comprising the shared secret corresponding to the transaction shared secret identifier;

comparing the transaction hash value and the verification hash value to determine if the electronic transaction is valid;

responsive to receiving the authentication data from the user device and regardless of the transaction hash value matching the verification hash value, invalidating, by the validation platform, the shared secret by setting the status of the shared secret to invalid; and responsive to the electronic transaction being determined as being valid, transmitting a notification to a server to execute the electronic transaction.

2. The method according to claim 1, wherein the validation platform provisions the user device with a plurality of shared secrets and a plurality of shared secret identifiers, each shared secret identifier corresponding to a respective shared secret.

3. The method according to claim 1, wherein data used to calculate the verification hash value further comprises information relating to identification of the user.

4. The method according to claim 1, further comprising:

transmitting a message to an issuer computer indicating a result of comparing the transaction hash value and the verification hash value.

5. The method according to claim 2, wherein the validation platform transmits the plurality of shared secrets and the plurality of shared secret identifiers to the user device via a first communication link, the first communication link communicating data using an Internet Protocol.

6. The method according to claim 1, wherein the transaction comprises a contactless payment transaction, and the user device is a mobile device comprising a contactless payment device.

7. The method according to claim 2, wherein the validation platform transmits the plurality of shared secrets and the plurality of shared secret identifiers via a first communication link, and wherein the user device transmits the authentication data via a second communication link different from the first communication link.

8. The method according to claim 7, wherein the second communication link is a wireless communication link.

9. A device comprising:

a processor, and a memory storing executable instructions, which when executed by the processor, causes the device to perform operations including:

setting a status associated with a shared secret as being valid, the status limiting usage of the shared secret to at most one electronic transaction;

provisioning a user device with the shared secret and a shared secret identifier associated with the shared secret;

receiving authentication data for an electronic transaction, the authentication data identifying a user of the user device and comprising a transaction hash value and a transaction shared secret identifier;

verifying that the electronic transaction shared secret identifier corresponds to a valid shared secret based on the status associated with the shared secret corresponding to the transaction shared secret identifier;

calculating a verification hash value by calculating a one-way hash of data comprising the shared secret corresponding to the transaction shared secret identifier;

comparing the transaction hash value and the verification hash value to determine if the electronic transaction is valid; and responsive to receiving the authentication data from the user device and regardless of the transaction hash value matching the verification hash value, invalidating the shared secret by setting the status of the shared secret to invalid.

10. The device according to claim 9, wherein the processor causes the device to further perform:

provisioning the user device with a plurality of shared secrets and a plurality of shared secret identifiers, each shared secret identifier corresponding to a respective shared secret.

11. The device according to claim 9, wherein data used to calculate the verification hash value further comprises information relating to identification of the user.

12. The device according to claim 9, wherein the processor causes the device to further perform:

transmitting a message to an issuer computer indicating a result of comparing the transaction hash value and the verification hash value.

13. The device according to claim 10, wherein the device transmits the plurality of shared secrets and the plurality of shared secret identifiers to the user device via a first communication link, the first communication link communicating data using an Internet Protocol.

14. The device according to claim 9, wherein the transaction comprises a contactless payment transaction, and the user device is a mobile device comprising a contactless payment device.

15. The device according to claim 10, wherein the device transmits the plurality of shared secrets and the plurality of shared secret identifiers via a first communication link, and wherein the user device transmits the authentication data via a second communication link different from the first communication link.

16. The device according to claim 15, wherein the second communication link is a wireless communication link.

* * * * *